United States Patent Office 3,776,902
Patented Dec. 4, 1973

3,776,902
NOVEL Δ$^{1,3,5(10)}$-ESTRATRIENES
Jean-Claude Gasc, Bondy, and Andre Pierdet, Noisy-le-Sec, France, assignors to Roussel-UCLAF, Paris, France
No Drawing. Filed Sept. 1, 1972, Ser. No. 285,885
Claims priority, application France, Sept. 10, 1971, 7132703
Int. Cl. C07c 169/08, 173/00
U.S. Cl. 260—239.55 R           7 Claims

ABSTRACT OF THE DISCLOSURE

Novel 11β - alkoxy - Δ$^{1,3,5(10)}$ - estratrienes of the formula

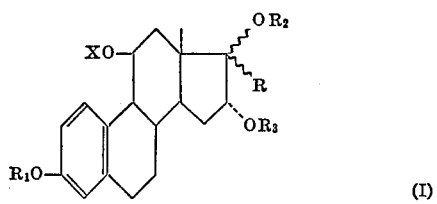

wherein X is selected from the group consisting of methyl and ethyl, $R_1$ is selected from the group consisting of hydrogen and acyl of an organic carboxylic acid of 1 to 18 carbon atoms, R is selected from the group consisting of hydrogen and unsaturated hydrocarbon of 2 to 4 carbon atoms, $R_2$ is selected from the group consisting of hydrogen and acyl of an organic carboxylic acid of 1 to 18 carbon atoms when R is hydrogen and $R_2$ is with $R_3$, when $OR_2$ and $OR_3$ have the same spatial configuration, an alkylidene or aralkylidene in the form of

wherein A is selected from the group consisting of hydrogen and hydrocarbon and B is a hydrocarbon and $R_3$ may also be selected from the group consisting of hydrogen and acyl of an organic carboxylic acid of 1 to 18 carbon atoms and the wavy lines mean that the substituent may be in the α or β configuration having intense uterotrophic and estrogenic activity and very intense antigonadotrophic activity and their preparation.

STATE OF THE ART

French BSM patent No. 4,339 M describes 11,16-dihydroxy-estradiol which is useful for the treatment of hypercholesterolemia and U.S. Pat. No. 3,579,545 describes 11β-alkoxy derivatives of estradiol which are not oxygenated in the 16-position and U.S. Pat. No. 3,449,-383 describes 11,16-dihydroxy derivatives of estradiol which do not contain any 11-alkoxy derivatives and do not contain any 17-hydrocarbon group.

OBJECTS OF THE INVENTION

It is an object of the invention to provide the novel 11β-alkoxy-Δ$^{1,3,5(10)}$-estratrienes of Formula I.

It is another object of the invention to provide a novel process and novel intermediates for the compounds of Formula I.

It is another object of the invention to provide novel estrogenic and antigonadotrophic compositions.

It is a further object of the invention to provide a novel method of inducing estrogenic activity in warm-blooded animals.

These and other objects and advantages of the invention will become obvious from the following detailed description.

THE INVENTION

The novel compounds of the invention have the formula

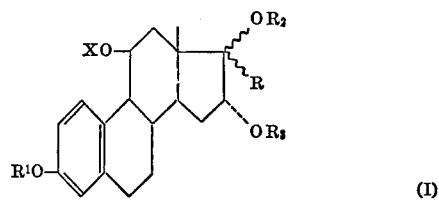

wherein X is selected from the group consisting of methyl and ethyl, $R_1$ is selected from the group consisting of hydrogen and acyl of an organic carboxylic acid of 1 to 18 carbon atoms, R is selected from the group consisting of hydrogen and unsaturated hydrocarbon of 2 to 4 carbon atoms, $R_2$ is selected from the group consisting of hydrogen and acyl of an organic carboxylic acid of 1 to 18 carbon atoms when R is hydrogen and $R_2$ is with $R_3$, when $OR_2$ and $OR_3$ have the same spatial configuration, an alkylidene or aralkylidene in the form of

wherein A is selected from the group consisting of hydrogen and hydrocarbon and B is a hydrocarbon and $R_3$ may also be selected from the group consisting of hydrogen and acyl of an organic carboxylic acid of 1 to 18 carbon atoms and the wavy lines mean that the substituent may be in the α or β configuration. R may be hydrogen, vinyl, propenyl, ethynyl, propargyl, etc.

Among the more preferred compounds are 11β-methoxy - Δ$^{1,3,5(10)}$ - estratriene - 3,16α,17β - triol, 11β-methoxy - 17α - ethynyl - Δ$^{1,3,5(10)}$ - estratriene - 3,16α,17β-triol and 11β - methoxy - 17β - ethynyl - Δ$^{1,3,5(10)}$-estratriene - 3,16α,17α - triol. The acyl radical is preferably derived from a hydrocarbon carboxylic acid of 1 to 18 carbon atoms.

Examples of suitable acids are alkanoic acids, such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelargonic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentayl propionic acid and cyclohexyl propionic acid; arylalkanoic acids such as phenylacetic acid and phenylpropionic acid; aryl carboxylic acids such as benzoic acid and 3,4,5 - trimethoxybenzoic acid; phenoxy alkanoic acids such as phenoxyacetic acid, p-chlorophenoxy acetic acid, 4 - tert.-butylphenoxy acetic acid and 4-phenoxy butyric acid; heterocyclic carboxylic acids such as furance - 2 - carboxylic acid, 5-tert.-butyl-furane - 2 - carboxylic acid and 5-bromofurane-2-carboxylic acid; β-ketoalkanoic acids such as acetylacetic acid, propionylacetic and butyrylacetic acid; amino acids such as diethylaminoacetic acid and aspartic acid.

The novel process of the invention comprises reacting in an acid media 11β-OX-Δ$^{1,3,5(10)}$-estratriene-3-ol-17-one wherein X is selected from the group consisting of methyl and ethyl with an acylating agent of an organic carboxylic acid to form 3,17-diacyloxy-11β-alkoxy-Δ$^{1,3,5(10),16}$-estratetraene of the formula

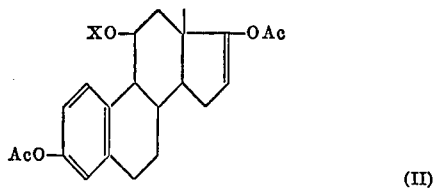

(II)

wherein Ac is acyl of an organic carboxylic acid of 1 to 18 carbon atoms, reacting the latter with an organic peracid to obtain a 16α,17α-epoxy compound of the formula

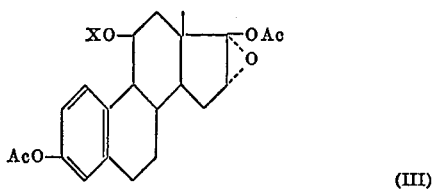

(III)

hydrolyzing the latter in an acid media to obtain a 3,16α-diol compound of the formula

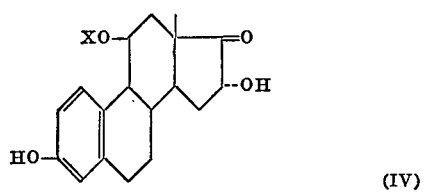

(IV)

and the latter may be either treated with an alkaline reducing agent to form 11β-alkoxy-Δ$^{1,3,5(10)}$-estratriene-3, 16α,17β-triol which can be esterified in the 3-position or in the 3,16,17-positions with an organic carboxylic acid of 1 to 18 carbom atoms or its functional derivatives or after the esterification with a reactant for hydrocarbonylation containing the radical R and the 3,16α-diacyl compound may be saponified in an alkaline media to obtain the corresponding 11β-OX-17β-R-Δ$^{1,3,5(10)}$ - estratriene - 3, 16α,17α-triol and 11β-OX-17α-R-Δ$^{1,3,5(10)}$-estratriene - 3 16α,17β-triol which can be esterified in the 3- or 3 and 16-positions with an organic carboxylic acid of 1 to 18 carbon atoms or a functional derivative thereof or when 16 and 17 hydroxy have the same spatial configuration form a ketonide by condensation of an aliphatic or aralipharic ketone or aldehyde in the presence of mineral or organic acid.

In preferred embodiments of the invention, the acylation is effected with an isopropenyl ester or a carboxylic acid anhydride in the presence of a strong mineral acid such as sulfuric acid or perchloric acid. The organic peracid may be aliphatic such as peracetic acid, perpropionic acid or trifluoroperacetic acid or aromatic such as p-nitroperbenzoic acid, m-chloroperbenzoic acid, perbenzoic acid or monoperphthalic acid.

The hydrolysis of the 16α,17α-epoxy group is preferably effected with a stronger mineral acid such as surfuric acid, perchloric acid or hydrochloric acid or a Lewis acid such as boron trifluoride or a complex thereof such as with ether or acetic acid. The alkaline reducing agent is preferably an alkali metal borohydride, an alkali metal tertbutoxy borohydride or an alkali metal aluminum hydride or an alkali metal in the presence of an alkanol.

The esterification of 11β-OX-Δ$^{1,3,5(10)}$-estratriene-3,16α, 17β-triol in the 3-position may be effected with an acid halide of an organic carboxylic acid in the presence of an alkali metal hydroxide or in the 3,16α and 17β-positions with an anhydride or an acid halide of an organic carboxylic acid in the presence of pyridine or triethylamine. The hydrocarbonylation agent is an alkynyl magnesium halide or alkali metal acetylide or acetylene in the presence of an alkaline agent such as sodium amide or potassium tertbutylate or alkenyl magnesium halide or alkynyl lithium.

The esterification of the product of Formula IV may be effected with acetic anhydride in the presence of pyridine and saponification may be effected with an alkali metal hydroxide. The esterification on 11β - OX-17α-R-Δ$^{1,3,5(10)}$-estratriene-3,16α,17β-triol and 11β - OX-17β-R-Δ$^{1,3,5(10)}$-estratriene-3,16α,17β-triol may be effected with an organic carboxylic acid anhydride in the presence of a basic agent such as pyridine or triethylamine.

The novel intermediates which are a part of the invention are the compounds of Formulae II, III and IV wherein X and Ac have the above definitions.

The starting materials for the process of the invention, namely 11β-methoxy-estrone and 11β-ethoxy-estrone, may be prepared by the process described in French Pat. 1,514,122.

The novel therapeutic composition of the invention are comprised of an effective amount of a compound of Formula I and a pharmaceutical carrier. The compositions may be in the form of injectable solutions or suspensions in ready to use ampoules or multiple dose flacons or in the form of tablets, coated tablets, capsules, sublingual tablets, dragees, drinkable emulsions, suppositories, creams, lotions or pomades prepared in known manner.

The compositions possess particularly intense estrogenic and uterotrophic properties at very low doses and manifest a very intense antigonadotrophic activity. Moreover, the 17-hydroxy compounds are active orally and show a surprisingly high level of activity when compared to other known 16-hydroxy-compounds. Estriol only shows 10% of the estrogenic activity of estradiol and epiestriol only shows 15% of the activity of estradiol. The compounds of Formula I manifest an uterotrophic activity clearly superior to that of estradiol and also, the compounds containing an unsaturated hydrocarbon in the 17-position have an activity whether orally or subcutaneously administered clearly superior to ethynyl estradiol.

The compositions of the invention are therefore useful for the treatment of insufficient ovarian secretion and the treatment or prevention of side effects due to menopause or castration. They may also be employed as adjuvant treatment of prostatic adenome and as a contraceptive alone or in sequential treatment with a progestative.

The novel method of inducing estrogenic and antigonadotrophic activity in warm-blooded animals comprises administering to warm-blooded animals an effective amount of a compound of Formula I. The compounds may be administered orally, subcutaneously, perlingually, rectually or topically. The usual daily dosage is 0.2 to 4 μg./kg. depending on the particular compound used or the methd of administration.

In the following examples there are described several preferred embodiments to illustrate the invention. However, it should be understood that the invention is not intended to be limited to the specific embodiments.

EXAMPLE I

11β-methoxy-Δ$^{1,3,5(10)}$-estratriene-3,16α,17β-triol

Step A: 3,17 - diacetoxy-11β-methoxy-Δ$^{1,3,5(10),16}$-estratetraene: A mixture of 2 g. of 11β-methoxy-Δ$^{1,3,5(10)}$-estratetriene-3-ol-17-one, 14 ml. of isopropenyl acetate and 0.6 ml. of a solution of 1 ml. of sulfuric acid q.s.p. 50 ml. of isopropenyl acetate was refluxed and over 1 hour, 10 ml. of distillate were recovered. Then, 8 ml. of isopropenyl acetate and 0.4 ml. of the sulfuric acid in isopropenyl acetate were added thereto and another 8 ml. of distillate were recovered. The solution was cooled and added to ether and the ether phase was washed at 5° C. with an aqueous saturated sodium bicarbonate solution. The wash waters were extracted with ether and the combined organic phases were dried over sodium sulfate and evaporated to dryness. The residue was chromatographed over silica gel and was eluted with a 90–10 benzene-ethyl acetate mixture to obtain 1.2 g. of 3,17-diacetoxy-11β-methoxy-Δ$^{1,3,5(10),16}$-estratetraene. For analysis, 800 mg. of the product were crystallized from methanol to obtain 643 mg. of pure product in the form of white crystals melting at 114° C.

I.R. spectrum (chloroform): Presence of aromatic and of carbonyl.

U.V. spectrum.

(1) Ethanol:

Inflex, towards 262 nm. $E^{1\%}_{1 cm.}=14$.

Max. at 268 nm. $E^{1\%}_{1 cm.}=18$.

Max. at 275 nm. $E^{1\%}_{1 cm.}=18$ (2) Ethanol-N/10 sodium hydroxide:

Max. at 243 nm. $E^{1\%}_{1 cm.}=244$

Max. at 299 nm. $E^{1\%}_{1 cm.}=75$

Step B: 3,17-diacetoxy - 11β - methoxy-16α,17α-epoxy-Δ$^{1,3,5(10)}$-estratriene: 4.37 g. of m-chloroperbenzoic acid were added with stirring under a nitrogen atmosphere to a solution of 7.2 g. of 3,17-diacetoxy-11β-methoxy-Δ$^{1,3,5(10),16}$-estratetraene in 100 ml. of methylene chloride at −15° C. and after stirring for 1 hour at this temperature, the mixture was poured into an aqueous saturated sodium bicarbonate solution. The mixture was decanted and the aqueous phase was extracted with methylene chloride. The organic phase was washed with water, dried over sodium sulfate and evaporated to dryness. The residue was dissolved in 20 ml. of boiling methanol and the solution was filtered hot, iced overnight and vacuum filtered to obtain 6.4 g. of 3,17β-diacetoxy-11β-methoxy-16α,17α-epoxy-Δ$^{1,3,5(10)}$-estratiene melting at 131–132° C. The product occurred as white crystals soluble in chloroform and insoluble in water.

I.R. spectrum (chloroform): Presence of CO at 1767 and 1749 cm.$^{-1}$.

U.V. spectrum.

(1) Ethanol:

Inflex. towards 216 nm. $E^{1\%}_{1 cm.}=245$

Inflex. towards 262 nm. $E^{1\%}_{1 cm.}=13$

Max. at 268 nm. $E^{1\%}_{1 cm.}=17.2$

Max at 275 nm. $E^{1\%}_{1 cm.}=17.4$ (2) Ethanol—N/10 sodium hydroxide:

Max. at 243 nm. $E^{1\%}_{1 cm.}=239$

Max. at 299 nm. $E^{1\%}_{1 cm.}=72$

Step C: 11β-methoxy-Δ$^{1,3,5(10)}$-estratriene-3,16α-diol-17-one: A solution of 6 g. of 3,17β-diacetoxy-11β-methoxy-16α,17α-epoxy-Δ$^{1,3,5(10)}$-estratriene in 30 ml. of methanol and 6 ml. of 6 N sulfuric acid was refluxed for 1½ hours and 70 ml. of water was added while hot and crystallization was induced. The mixture was stirred one hour at 20° C. and vacuum filtered and the product was dried under reduced pressure to obtain 4.3 g. of 11β-methoxy-Δ$^{1,3,5(10)}$-estratriene-3,16α-diol-17-one in the form of white crystals melting at 250° C. and soluble in ethanol and insoluble in water.

I.R. spectrum (nujol): Presence of carbonyl at 1726 cm.$^{-1}$ of aromatic C=C at 1610 cm.$^{-1}$ and of OH.

U.V. spectrum.

(1) Ethanol:

Inflex, towards 220 nm. $E^{1\%}_{1 cm.}=238$

Inflex, towards 228 nm. $E^{1\%}_{1 cm.}=180$

Max. at 281 nm. $E^{1\%}_{1 cm.}=62$ $\epsilon=1940$

Max. at 287 nm. $E^{1\%}_{1 cm.}=57$ $\epsilon=1780$ (2) Ethanol—N/10 sodium hydroxide:

Max. at 243 nm. $E^{1\%}_{1 cm.}=285$

Max. at 299 nm. $E^{1\%}_{1 cm.}=86$

RMN spectrum (deutero pyridine):

| | Hz. |
|---|---|
| 18-CH$_3$ | 73 |
| 11-OCH$_3$ | 192.5 |
| 11-H | 248 |
| Benzenic H | 400 |

Step D: 11β - methoxy-Δ$^{1,3,5(10)}$-estratriene-3,16α-17β-triol: 1.07 g. of sodium borohydride was added at 15° C. to a solution of 4.3 g. of 11β-methoxy-Δ$^{1,3,5(10)}$-estratriene-3,16α-diol-17-one in 86 ml. of methanol and after stirring at 15° C. for 45 minutes, the mixture was added to ice water. The precipitate recovered by vacuum filtration was washed with water and dried under reduced pressure. The product was crystallized from ethyl acetate to obtain 2.5 g. of 11β-methoxy-Δ$^{1,3,5(10)}$-estratriene-3,16α,17β-triol melting at 190–228° C. The melting point was unchanged after crystallization from ethanol and the white crystals were slightly soluble in ethanol and insoluble in water.

Analysis: $C_{19}H_{20}O_4$; molecular weight=318.40. Calculated (percent): C, 71.67; H, 8.23. Found (percent): C, 71.1; H, 8.3.

I.R. spectrum (nujol): Aromatic bands at 1621, 1584 and 1494 cm.$^{-1}$.

U.V. spectrum:

(1) Ethanol:

Inflex. towards 216 nm. $E^{1\%}_{1 cm.}=212$

Inflex. towards 221 nm. $E^{1\%}_{1 cm.}=205$

Max. at 229 nm. $E^{1\%}_{1 cm.}=149$

Max. at 280 nm. $E^{1\%}_{1 cm.}=57$

Inflex. towards 285–286 nm. $E^{1\%}_{1 cm.}=51$ (2) Ethanol—N/10 sodium hydroxide:

Max. at 243 nm. $E^{1\%}_{1 cm.}=277$

Max. at 298 nm. $E^{1\%}_{1 cm.}=82$

RMN spectrum (deutero pyridine):

| | Hz. |
|---|---|
| 18-CH$_3$ | 83 |
| 11-OCH$_3$ | 194 |
| H at 11, 16 and 17 | 248 |
| Benzenic H toward | 420 |

EXAMPLE II

11β-methoxy-17-α-ethynyl-Δ$^{1,3,5(10)}$-estratriene-3,16α,17β-triol

A solution of 2.8 g. of 11β-methoxy-Δ$^{1,3,5(10)}$-estratriene-3,16α-diol - 17 - one (Step C—Example I) and 8 ml. of pyridine and 4 ml. of acetic anhydride was heated at 70° C. for 1 hour and after cooling to room temperature, ice was added. The pH was then adjusted to 1 by addition of 2 N hydrochloric acid and the mixture was extracted with methylene chloride. The organic phase was washed with water, dried over sodium sulfate and evaporated to dryness to obtain 3.75 g. of 3,16α-diacetoxy-11β-methoxy-Δ$^{1,3,5(10)}$-estratriene-17-one.

A mixture of 3.75 g. of the said product, 40 ml. of tetrahydrofuran and 210 ml. of a 0.48 M tetrahydrofuran solution of ethynyl magnesium bromide was stirred at room temperature under a nitrogen atmosphere for 4 hours and after cooling to 0° C., an aqueous solution of ammonium chloride was added thereto. The mixture was extracted with ethyl acetate and the organic phase was washed with water, dried over sodium sulfate and evaporated to dryness to obtain 4.6 g. of amorphous ethynyl product.

A mixture of 4.6 g. of the said ethynyl product, 20 ml. of ethanol and 2 ml. of 2 N sodium hydroxide was stirred for 45 minutes at room temperature and another 2 ml. of 2 N sodium hydroxide were added. After the mixture was stirred for 45 minutes, another ml. of 2 N sodium hydroxide was added and the mixture was stirred for 15 min.

utes and water was added. The mixture was acidified by addition of 2 N hydrochloric acid and extracted with methylene chloride and then with ethyl acetate. The organic phase was washed with water, dried over sodium sulfate and evaporated to dryness to obtain 4 g. of a mixture of 11$\beta$-methoxy-17$\alpha$-ethynyl-$\Delta^{1,3,5(10)}$-estratriene - 3,16$\alpha$,17$\beta$-triol and 11$\beta$ - methoxy-17$\beta$-ethynyl-$\Delta^{1,3,5(10)}$-estratriene-3,16$\alpha$,17$\alpha$-triol.

6 ml. of acetic acid anhydride were added to a solution of 4 g. of the above mixture in 12 ml. of pyridine and the mixture was allowed to stand overnight at room temperature. The mixture was then iced, acidified with 2 N hydrochloric acid and extracted with ethyl acetate. The organic phase was washed with water, dried over sodium sulfate and evaporated to dryness to obtain 4.1 g. of a mixture of 3,16$\alpha$-diacetoxy-11-methoxy-17$\alpha$-ethynyl-$\Delta^{1,3,5(10)}$-estratriene-17$\beta$-ol and 3,16$\alpha$-diacetoxy-11$\beta$-methoxy-17$\beta$-ethynyl-$\Delta^{1,3,5(10)}$-estratriene-17$\alpha$-ol.

The 4.1 g. of the said mixture was chromatographed over silica gel and was eluted with a 9–1 chloroform-ethyl acetate mixture to obtain 1.83 g. of 3,16$\alpha$-diacetoxy-11$\beta$-methoxy-17$\alpha$-ethynyl-$\Delta^{1,3,5(10)}$-estratriene - 17$\beta$ - ol melting at 176° C. and 0.87 g. of 3,16$\alpha$-diacetoxy-11$\beta$-methoxy-17$\beta$-ethynyl-$\Delta^{1,3,5(10)}$-estratriene-17$\alpha$ - ol melting at 205° C. 1.7 g. of the 17$\beta$-ol derivative in 10 ml. of ethanol and 5 ml. of 2 N sodium hydroxide was stirred under a nitrogen atmosphere for 30 minutes at room temperature and after the addition of another 5 ml. of 2 N sodium hydroxide, it was stirred for 30 minutes. A product precipitated on addition of 11 ml. of 2 N hydrochloric acid and 30 ml. of water and the mixture was vacuum filtered. The product was washed with water and dried and the resulting raw product was dissolved in 60 ml. of a 50–50 methylene chloride-ethanol mixture at reflux. The methylene chloride was then evaporated and after cooling to room temperature, the mixture was allowed to crystallize for 1 hour. The mixture was vacuum filtered and the crystals were washed with ethanol and dried. Another crystallization under the same conditions resulted in 0.607 g. of 11$\beta$-methoxy-17$\alpha$-ethynyl-$\Delta^{1,3,5(10)}$-estratriene-3,16$\alpha$,17$\beta$-triol melting at 270° C. and having a specific rotation $[\alpha]_D^{20}=-26°$ (c.=0.5% pyridine). The product occurred in the form of white crystals soluble in pyridine and insoluble in water.

Analysis: $C_{21}H_{26}O_4$; molecular weight=342.44. Calculated (percent): C, 73.66; H, 7.66. Found (percent): C, 73.6; H, 7.7.

I.R. spectrum (nujol): Aromatic bands at 1625, 1617 and 1587 cm.$^{-1}$, associated OH, free OH and C≡CH.

EXAMPLE III

11$\beta$-methoxy-17$\beta$-ethynyl-$\Delta^{1,3,5(10)}$-estratriene-3,16$\alpha$,17$\alpha$-triol 0.84 g. of 3,16$\alpha$-diacetoxy-11$\beta$-methoxy-17$\beta$-ethynyl-$\Delta^{1,3,5(10)}$-estratriene-17$\alpha$-ol was introduced under a nitrogen atmosphere into 5 ml. of ethanol and 3 ml. of 2 N sodium hydroxide and after standing at room temperature for 15 minutes, another 2 ml. of 2 N sodium hydroxide were added thereto. The mixture was heated at 60° for 30 minutes and then was cooled and 20 ml. of water and 6 ml. of 2 N hydrochloric acid was added. The precipitate formed was recovered by vacuum filtration and washed with water to obtain 0.60 g. of 11$\beta$-methoxy-17$\beta$-ethynyl-$\Delta^{1,3,5(10)}$-estratriene-3,16$\alpha$,17$\alpha$-triol melting above 260° C. and soluble in dimethylformamide and pyridine.

EXAMPLE IV

11$\beta$-methoxy-17$\beta$-ethynyl-16$\alpha$,17$\alpha$-isopropylidenedioxy-$\Delta^{1,3,5(10)}$-estratriene 3-ol 0.54 g. of 11$\beta$-methoxy-17$\beta$-ethynyl-$\Delta^{1,3,5(10)}$-estratriene-3,16$\alpha$,17$\alpha$-triol was added under an inert atmosphere to 10 ml. of acetone and 0.025 g. of p-toluene sulfonic acid and after standing for 6 hours at room temperature, 0.02 ml. of triethylamine and then water were added thereto. The precipitate formed was recovered by vacuum filtration and was washed with water and dried under reduced pressure to obtain 0.52 g. of 11$\beta$-methoxy-17$\beta$-ethynyl - 16$\alpha$,17$\alpha$ - isopropylidenedioxy - $\Delta^{1,3,5(10)}$ - estratriene-3-ol melting at 270° and soluble in methylene chloride. Purification by passage over silica gel did not change the melting point.

I.R. spectrum (chloroform): Presence of hydroxy, ethynyl isopropyl.

EXAMPLE V

11$\beta$-methoxy-17$\beta$-ethynyl-$\Delta^{1,3,5(10)}$-estratriene-3,16$\alpha$,17$\alpha$-triol 0.45 g. of the isopropyidene derivative of Example IV was added under a nitrogen atmosphere to 5 ml. of ethanol, 0.5 ml. of water and 0.5 ml. of 12 N hydrochloric acid solution and the mixture was stirred at room temperature for 15 minutes and then refluxed for seven hours which progressively adding 5 ml. of 6 N hydrochloric acid. The mixture was returned to room temperature and then 30 ml. of water were added thereto. The precipitate was recovered by vacuum filtration and was washed with water to obtained 0.35 g. of 11$\beta$-methoxy-17$\beta$-ethynyl-$\Delta^{1,3,5(10)}$-estratriene-3,16$\alpha$,17$\alpha$-triol in the form of beige crystals melting above 260° C. A supplemental purification by empasting with hot ethyl acetate gave 0.225 g. of the product melting at 293° C. Another crystalliztaion gave a melting point of 295° C. The product was homogenous in thin layer chromatography.

Analysis: Calculated (percent): C, 73.66; H, 7.66. Found (percent): C, 73.6; H, 7.7.

I.R. spectrum (nujol): Presence of C≡CH, OH and aromatic substituted with a hetero-atom.

RMN spectrum: Peaks at 194.5 Hz. (ethynyl), 258 Hz. (11-H), 196 Hz. (hydrogens of 11-methoxy) and 84.5 Hz. (13-CH$_3$). Peaks of 418 to 456 Hz. (aromatic protons).

PHARMACOLOGICAL STUDY (A) Estrogenic activity—Lauson test

The test products, in solution or suspension in sesame oil containing 5% benzyl alcohol, were administered orally or subcutaneously twice a day for 3 days at increasing doses to rats 22 to 23 days old and weighing about 40 g. The animals were sacrificed on the fourth day and the uterus of each animal was removed dried and weighed. The results are reported in the following tables.

TABLE I.—SUBCUTANEOUS

| Products | Total doses in $\gamma$ | Weight of uterus in mg. |
|---|---|---|
| Controls | 0 | 25.6 |
| 11$\beta$-methoxy-$\Delta^{1,3,5(10)}$-estratriene-3,16$\alpha$,17$\beta$-triol | 0.01 | 33.4 |
|  | 0.03 | 33.8 |
|  | 0.1 | 53.2 |
|  | 0.3 | 69.4 |
| Controls | 0 | 32.2 |
| 11$\beta$-methoxy-17$\alpha$-ethynyl-$\Delta^{1,3,5(10)}$-estratriene-3,16$\alpha$,17$\beta$-triol | 0.01 | 31.5 |
|  | 0.03 | 47.0 |
|  | 0.1 | 97.3 |
|  | 0.3 | 136.3 |

TABLE II.—ORAL

| Controls | 0 | 25.6 |
|---|---|---|
| 11$\beta$-methoxy-$\Delta^{1,3,5(10)}$-estratriene-3,16$\alpha$,17$\beta$-triol | 0.01 | 28.4 |
|  | 0.03 | 31.7 |
|  | 0.1 | 66.5 |
|  | 0.3 | 94.4 |
| Controls | 0 | 50.8 |
| 11$\beta$-methoxy-17$\alpha$-ethynyl-$\Delta^{1,3,5(10)}$-estratriene-3,16$\alpha$,17$\beta$-triol | 0.03 | 73.3 |
|  | 0.09 | 116.1 |
|  | 0.27 | 126.6 |

(B) Estrogenic activity—Allen-Doisy test

The estrogenic activity on the vagina was determined on castrated rats to which 11$\beta$-methoxy-$\Delta^{1,3,5(10)}$-estratriene-3,16α,17β-triol was administered subcutaneously in a single dose in solution in sesame oil containing 5% benzyl alcohol. The vaginal smears were taken from the second day on after the treatment. The rat-unit of the test product (the dose provoking estrus in the rat during one day) is 20γ. Under the same conditions, the rat-unit of 16α-hydroxy-estrone is 500γ and that of estrone and estriol was 12γ and 150γ, respectively.

(C) Estrogenic activity—Rubin

Female mice aged 19 to 21 days were treated once a day for 3 days subcutaneously. The animals were sacrificed on the 4th day and the uterus was removed, dissected and weighed. The products were administered either subcutaneously or orally in an oil solution at a volume of 0.1 ml. at different doses. The results are reported in the following tables.

TABLE III.—SUBCUTANEOUS

| Total doses | 0γ | 0.03γ | 0.1γ | 0.3γ | 0.9γ |
|---|---|---|---|---|---|
| 11β-methoxy-Δ$^{1,3,5(10)}$-estratriene 3,16α,17β-triol | 11.8 | 18.3 | 24.6 | 43.3 | 49.6 |
|  | 0γ | 0.03γ |  | 0.09γ | 0.27γ |
| 11β-methoxy-17α-ethynyl-Δ$^{1,3,5(10)}$-estratriene-3,16α,17β-triol | 11.8 | 20.4 |  | 45.9 | 64.2 |

TABLE IV.—ORAL

| Total doses | 0γ | 0.03γ | 0.1γ | 0.3γ | 0.9γ |
|---|---|---|---|---|---|
| 11β-methoxy-Δ$^{1,3,5(10)}$-estratriene-3,16α,17β-triol | 11.1 | 16.3 | 30.4 | 49.2 | 53.4 |
|  | 0γ | 0.01γ | 0.03γ | 0.1γ | 0.27γ |
| 11β-methoxy-17α-ethynyl-Δ$^{1,3,5(10)}$-estratriene-3,16α,17β-triol | 11.1 | 16.9 | 24.7 | 55.4 | 7.70 |

The results of these test show that the studied products possess an important uterotrophic activity at a total dose of 0.1γ when administered orally and subcutaneously while extradiol is active in the same test at a subcutaneous dose of 0.27γ.

(D) Antigonadotrophic activity

The antigonadotrophic activity was determined on puberic rats weighing about 200 g. by subcutaneous administration of 11β-methoxy - Δ$^{1,3,5(10)}$ - estratriene-3,16α,17β-triol dissolved in sesame oil containing 5% benzyl alcohol in a volume of 0.2 ml. 12 treatments over 14 days are effected at daily doses of 1 and 10γ per animals. On the 15th day, the animals were killed by carotidien bleeding and the seminal vesicules, prostate, testicule and surrenals were removed and weighed. The results are shown in Table V:

TABLE V

|  | Quotient doses in γ | Testicules, mg. | Vesicules seminals, mg. | Prostate, mg. | Surrenals, mg |
|---|---|---|---|---|---|
| Controls | 0 | 2,607 | 360.0 | 314.0 | 59.4 |
| Test product | 1 | 2,657 | 309.3 | 239.0 | 65.6 |
|  | 10 | 2,290 | 139.1 (−61%) | 125.0 (−60%) | 76.6 |

The results of Table V show that the product has antigonadotrophic activity with a clear predominance anti-LH at a daily dose of 10γ without provoking surrenals aplasia.

Various modifications of the products and methods of the invention may be made without departing from the spirit or scope thereof and it should be understood that the invention is to be limited only as defined in the appended claims.

We claim:
1. An 11β-alkoxy-Δ$^{1,3,5(10)}$-estratriene of the formula

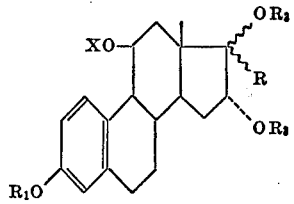

wherein X is selected from the group consisting of methyl and ethyl, $R_1$ is selected from the group consisting of hydrogen and acyl of an organic carboxylic acid of 1 to 18 carbon atoms, R is selected from the group consisting of hydrogen and unsaturated hydrocarbon of 2 to 4 carbon atoms, $R_2$ is selected from the group consisting of hydrogen and acyl of an organic carboxylic acid of 1 to 18 carbon atoms when R is hydrogen and $R_2$ is with $R_3$, when $OR_2$ and $OR_3$ have the same spatial configuration, an alkylidene or aralkylidene in the form of

wherein A is selected from the group consisting of hydrogen and hydrocarbon and B is a hydrocarbon and $R_3$ may also be selected from the group consisting of hydrogen and acyl of an organic carboxylic acid of 1 to 18 carbon atoms and the wavy lines mean that the substituent may be in the α or β configuration.

2. A compound of claim 1 which is 11β-methoxy-Δ$^{1,3,5(10)}$-estratriene-3,16α,17β-triol.

3. A compound of claim 1 which is 11β-methoxy-17α-ethynyl-Δ$^{1,3,5(10)}$-estratriene-3,16α,17β-triol.

4. A compound of claim 1 which is 11β-methoxy-17β-ethynyl-Δ$^{1,3,5(10)}$-estratriene-3,16α,17α-triol.

5. An 11β-alkoxy-Δ$^{1,3,5(10),16}$-estratetraene of the formula

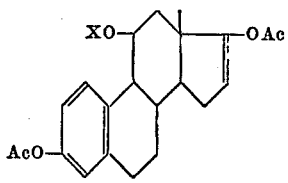

wherein X is selected from the group consisting of methyl and ethyl and Ac is an acyl of an organic carboxylic acid of 1 to 18 carbon atoms.

6. A 16α,17α-epoxy-Δ$^{1,3,5(10)}$-estratriene of the formula

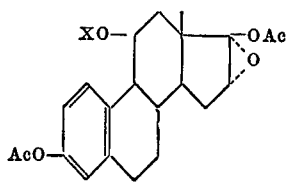

wherein X is selected from the group consisting of methyl and ethyl and Ac is an acyl of an organic carboxylic acid of 1 to 18 carbon atoms.

7. An 11β-alkoxy-Δ$^{1,3,5(10)}$-estratriene-17-one of the formula

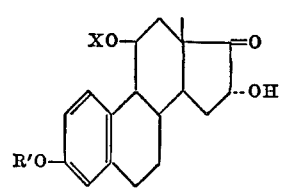

wherein X is selected from the group consisting of methyl and ethyl and R' is selected from the group consisting of hydrogen and acyl of an organic carboxylic acid of 1 to 18 carbon atoms.

References Cited

UNITED STATES PATENTS

| | | | |
|---|---|---|---|
| 3,318,926 | 5/1967 | Anner et al. | 260—397.4 |
| 3,551,459 | 12/1970 | Hughes et al. | 260—397.4 |
| 3,449,383 | 6/1969 | Baran | 260—397.5 |
| 3,579,545 | 5/1971 | Bertin et al. | 260—397.5 |

HENRY A. FRENCH, Primary Examiner

U.S. Cl. X.R.

260—239.55 D, 397.45, 397.5; 424—238